United States Patent
Deysel

[11] 3,910,456
[45] Oct. 7, 1975

[54] SEED EXTRACTING MEANS FOR PLANTERS

[75] Inventor: Christoffel Johannes Deysel, Buckingham, South Africa

[73] Assignee: Deysel 32 Implemente Limited, South Africa

[22] Filed: Mar. 14, 1974

[21] Appl. No.: 451,320

[30] Foreign Application Priority Data
Feb. 23, 1973  South Africa.................... 73/1303

[52] U.S. Cl. ............................................... 221/254
[51] Int. Cl.² ............................................. A01C 7/08
[58] Field of Search .......... 221/220, 263, 266, 254, 221/260, 277

[56] References Cited
UNITED STATES PATENTS
3,295,659  1/1967  Aidlin............................ 221/169 X
3,572,547  3/1971  Walberg........................... 221/260
3,572,548  3/1971  Fuchs.............................. 221/254

*Primary Examiner*—Stanley H. Tollberg
*Attorney, Agent, or Firm*—Jay M. Cantor

[57] ABSTRACT

This invention relates to a machine for withdrawing seed which may vary in size and shape, within limits, one by one from an random seed supply at regular intervals for subsequent planting at equal spacing in a land.

The machine according to the invention provides at least one receptacle on a resilient arm and is cyclically passed through the seed supply within a container. The receptacle is adapted to pick up one seed only from the supply for transference along a surface to a discharge opening. The or each receptacle is of a shape and size to accommodate only one seed and comprises a substantially parabolically shaped strip arranged parallel with the said surface and with the widely spaced ends directed in the direction of movement of the receptacle while a sloping tongue extends from the curved end of the strip in spaced relationship to the outwardly divergent portions in the direction of movement of the receptacle and substantially slopingly relative to the said surface.

7 Claims, 4 Drawing Figures

U.S. Patent   Oct. 7, 1975   3,910,456
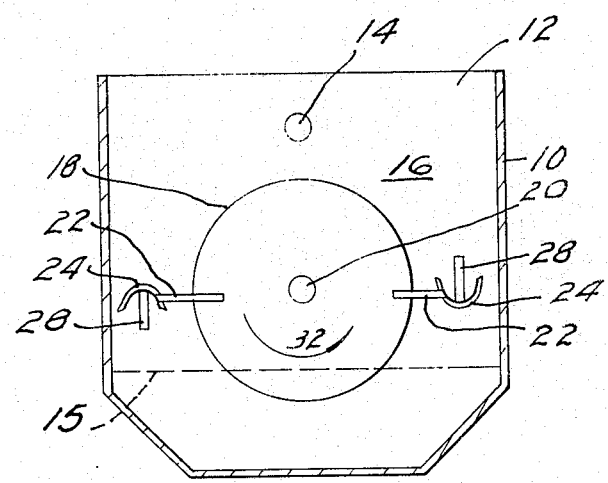
FIG. 1
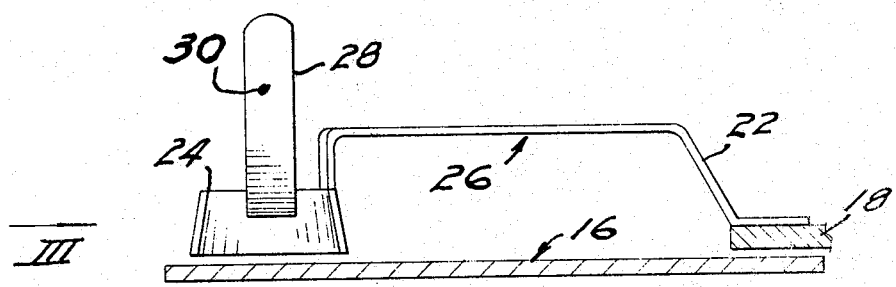
FIG. 2
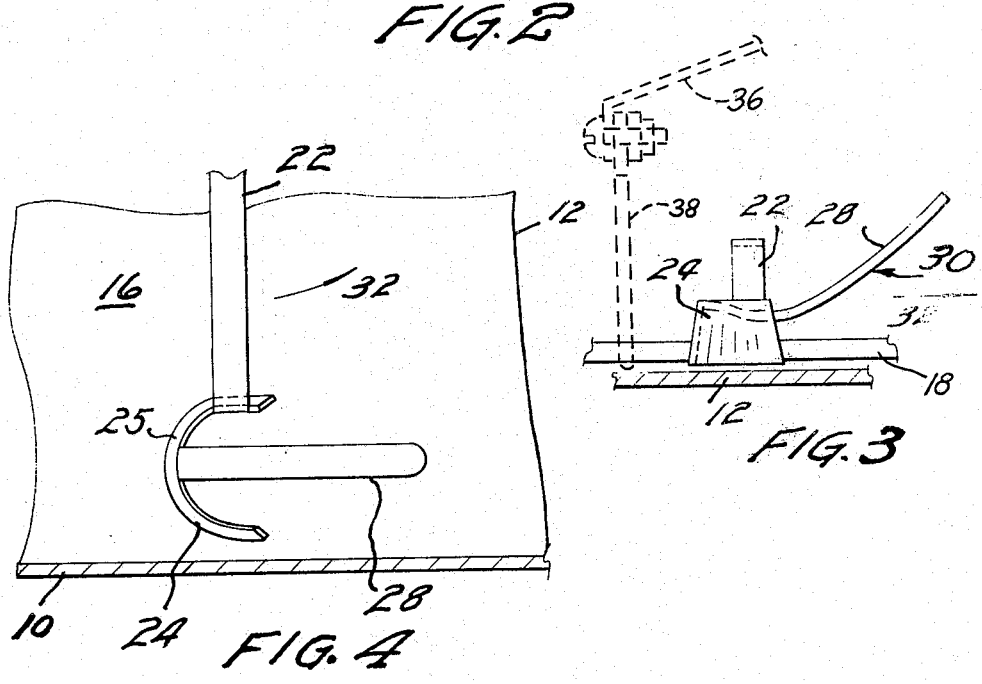
FIG. 4
FIG. 3

SEED EXTRACTING MEANS FOR PLANTERS

BACKGROUND TO THE INVENTION

1. Field of the Invention

The invention falls within the field of agricultural machines for ensuring the supply of single seeds at regular intervals to obtain planting of seeds in the soil at equal spacings.

2. Object of the Invention

It is an object of the invention to provide a mechanism whereby seeds of varying shapes and sizes, within limit, are extracted one by one from an at random seed supply in a container and subsequent discharge for planting of the extracted seeds in a land at equal spacing.

SUMMARY OF THE INVENTION

According to this invention a method of extracting seeds one by one from a supply of seeds from a container for discharge at regular intervals is provided which includes cyclically passing at least one seed receptacle through the seed supply, withdrawing of only one seed by the receptacle from the supply by lodgement of one seed in the receptacle and sliding such seed under light pressure along an internal face of the container to an opening in the container at a position spaced from the seed supply, and directing the seed into said opening for discharge.

The method provides for applying a light resilient pressure by the receptacle on the seed lodged therein for maintaining engagement of the seed with the surface during transference to the opening. The light pressure also automatically adapts the receptacle to suit seeds of different thicknesses. The displacement of the seed from the receptacle into the discharge opening may be gravitational although such discharge is assisted by the light resilient pressure.

The surface along which the seed is transfered for discharge may be vertically, slopingly or horizontally disposed while the discharge opening is located at a position spaced and/or isolated from that region of the surface on which the supply of seed is concentrated. The receptacle is conveniently arranged to move along an annular path and is lightly biassed towards the surface. The receptacle is preferably movable across the surface in close spaced relationship.

Also according to the invention means for the controlled removal and release of seeds from an at random supply of seeds is provided which includes a container for the supply of seeds and providing an internal surface having a seed discharge and lead-off opening at a position spaced from the seed supply, at least one seed receptacle for receiving a single seed and being movable within the container for cyclically passing through the seed supply and across the said surface and intermittently across the said opening, the receptacle having a wide open end directed in the direction of movement and an open side directed towards the surface whereby a single seed becomes lodged in the receptacle when moving through the seed supply for withdrawal of the seed and transfer of the seed to the opening into which it is directed for discharge.

The seed receptacle is attached to a rotatably driven part which extends into the container. More than one receptacle may be attached to the rotatably driven part at regular spaced intervals.

The or each receptacle is attached to the rotatably driven part by a resilient arm adapted to force the receptacle towards the internal surface of the container. The arm is preferably movable across the surface in wide spaced relationship.

The receptacle advantageously comprises a parabolically shaped strip of a substantially rigid material attached to a free end of a cantilever-like arm extending radially from the rotatable part. The inwardly directed face of the parabolically shaped strip preferably extends from the surface of the container at a steep angle for the space within the strip to be outwardly convergent. To the curved portion of the parabolically shaped strip, forming the rear end of the receptacle, a tongue extends across the receptacle and beyond the ends of the divergent portions of the strip and is disposed generally outwardly sloping in relationship to the container surface. The face of the tongue directed to the container surface is advantageously of convex curved shape. The edges of the tongue are preferably spaced from the divergent portions of the parabolically shaped strip. The arrangement is such that when the receptacle moves outwardly from the seed supply any additional seeds, not suitably nested within the receptacle, are not sufficiently located and will drop away during the transference of the seed lodged in the receptacle to the discharge opening in the surface of the container.

In the case of a horizontal surface across which the receptacle is adapted to move a partition is preferably provided having along the bottom edge portion a deflectable screen, to isolate the seed supply from the discharge opening while the receptacle is movable through the screen.

For the invention to be clearly understood and carried into effect reference will now be made to the drawings which show, by way of example, one form of the invention.

IN THE DRAWINGS

FIG. 1 is a sectional view through a seed container having seed extracting means constructed according to the invention;

FIG. 2 is an enlarged fragmentary cross-section on line II—II of FIG. 1;

FIG. 3 is a fragmentary elevation in direction III of FIG. 2; and

FIG. 4 is a plan of FIGS. 2 and 3.

Referring to the drawings reference numeral 10 denotes a seed container having a vertical or sloping side 12 in which a seed discharge opening 14 is provided in the upper portion of the side 12. From the opening a seed directing tube or the like (not shown) extends for directing seeds for planting behind a planting furrow opening share which is also not shown. The opening 14 may be positioned at any suitable position above a normal level of the seeds contained in the container. Such level is indicated by a broken line and denoted by 15. Advantageously means are provided to supply the container 12 from a supply bin at a position near the bottom of container 12 in order to maintain a substantially constant level of seed within the container 10. Across the face 16 of the side 12 of the container 10 a rotatably driven disc 18 is mounted in close spaced relationship. The disc 18 is secured onto the end of a shaft 20 which extends through the container side 12. The disc 18 is mounted for rotational movement and in close spaced relationship relative to the surface 16. At diammetrically opposed positions on the disc 18 leaf spring arms 22 are secured which extend radially outwardly and having each rigidly attached to the outer end a parabolically shaped element 24. The divergent open end of each element 24 is substantially radially disposed while one of the sides of the element is attached to the arm 22. The intermediate portion of the arm 22 is raised as at 26 in order to be disposed in wide spaced relationship to the face 16 of the container side 12 while the element 24, which is slightly convergent in a direction away from the face 16, is disposed in close spaced relationship to the said face as is clearly shown in FIGS. 2 and 3.

Extending forwardly from the curved rear end 25 of the element 24, is a tongue 28. The tongue 28 is generally slopingly disposed relative to the face 16 of container side 12 and presents a substantially convex curved face 30 towards the face 16. It will be noted from the drawings that the side edges of the tongue 24 are in spaced relationship relative to the flanking portions of the element 24.

In operation any suitable drive is applied to the shaft 20 for rotation of the disc 18 in the direction of arrow 32 whereby the receptacle-forming elements 24 are intermittently caused to move through the supply of seeds when such receptacles each pick up a seed which becomes lodged on the concave face of the parabolically shaped element 24 and wedged between the tongue 30 and the face 16. Each seed is thus held and carried with such element 24. When the element 24 moves across the hole 14 the seed drops through the hole. The spring arm 22, due to its resiliency, permit thick seeds to be retained within the element 24. When such arm is slightly displaced against its spring bias such bias assists in removal of the seed from the receptacle due to a slight displacement towards the opening 14. To prevent locking of the elements 24 against a side of the hole 14, said hole may be slightly bevelled off. The size of each element 24 is such that a portion of the seed will protrude forwardly from the element or occupy the greatest portion thereof so that any seed resting on the lodged seed will drop off or will be displaced therefrom when the receptacle moves out of the supply of seeds so that only one seed at a time can be withdrawn from the seed plant for discharge into the hole 14.

During the extracting action the first seed engaged by the tongue 30 is directed to the element 24 so that it cannot be dislodged due to bumping actions to which a planter is subjected when in operation. Furthermore such holding action is light and substantially constant in order not to damage or crack the seeds while frictional resistance of a seed sliding along the face 16 is reduced and substantially negligible.

In the case where the internal flat surface is a horizontal bottom of the seed container, a partition 36 (shown in broken lines in FIG. 3) is provided. To the bottom edge portion of the partition 36 a deflectable screen is attached for downward extension onto the said flat surface. The deflectable screen provides a number of downwardly depending fingers or strips of rubber or like flexible material arranged adjacent each other. The partition 36 and screen 38 isolate the supply of seed on the left hand side of the partition from the discharge opening (not shown in FIG. 3) in the flat surface 12 on the right hand side thereof.

The elements 24, for planting maize, beans, or the like may be of a standard size and are capable of planting seeds of substantially any kind of shape. By providing smaller sized elements small seeds, such as sorghum, which may be of any shape, may be planted. Substantially wide elements may also be provided where it is desired to plant two, three or more seeds together as is at times preferred when planting for instance cotton, maize or the like.

To vary the planting spacing the number of arms and receptacles may be suitably varied or the speed of rotation of the disc and receptacle assembly may be changed.

I claim:

1. Means for controlled removal and release of seeds from an at random supply of seeds within a container having an internal surface with a seed discharge and lead-off opening at a position spaced from a portion on which the supply is concentrated, including a seed receptacle mounted on a resilient arm for movement within the container to cyclically pass through the seed supply and across the said surface and the opening, the seed receptacle being held by the resilient arm in close spaced relationship to the said surface of the container and relative to which surface the arm is disposed in wide spaced and substantially parallel relationship whereas the receptacle presents an open end directed in the direction of movement thereof and an open side directed towards the said surface whereby a single seed becomes lodged in the receptacle, when passing through the seed supply, for withdrawal of the seed from the supply and transference along the surface to the opening into which it is directed for discharge; the receptacle being also displaceable away from the said surface against the resiliency of the arm to accommodate seeds of different thicknesses.

2. Means as claimed in claim 1 wherein the receptacle comprises a parabolically shaped strip of substantially rigid material attached to a free end of a cantilever arm extending from a rotatably driven disc within the container, the parabolically shaped strip being disposed parallel with the internal surface of the container and with wide divergent ends of the strip directed in the direction of applied movement thereto while across the parabolically shaped strip a tongue is provided which is attached by one end to a curved part of the strip and arranged to extend forwardly beyond the divergent ends of the strip and generally outwardly sloping relative to the surface of the container across which the receptacle is movable.

3. Means as claimed in claim 1 wherein the internal surface of the container, having the opening, comprises a wall of the container.

4. Means as claimed in claim 1 wherein the internal surface having the opening is presented by the bottom of the container, the container providing a partition adapted to isolate the opening from the seed supply whereas the partition is provided with a resilient screen along a bottom edge region for passing therethrough of the receptacle when moving below the partition.

5. Means as claimed in claim 1 wherein more than one receptacle is provided and which are arranged at equal spaced intervals for cyclically passing through the seed supply and across the surface and the opening in said surface.

6. Controlled seed discharge means for a seed planter having a container for a supply of seeds to be planted and including an opening at a raised position in one of the upwardly extending sides of the container, a rotatably driven shaft extending into the container, a disc fixed to the shaft within the container and rotatable across a portion of the internal surface of said container side in close spaced relationship, a number of resilient arms extending substantially radially outwardly from the disc at similar spaced intervals and being disposed in wide spaced relationship relative to said internal surface of the container side, a receptacle of a size to receive and lodge a single seed secured to an outwardly extending free end of each arm and resiliently biassed by the arm to a position in close spaced relationship to the said container side surface, each receptacle comprising a substantially parabolically shaped strip converging in a direction away from the said surface and located with diverging ends in the direction of movement of the receptacle, the strip being provided with a curved tongue extending from a curved portion of the strip, forming the rear of the receptacle, in the direction of movement of the receptacle and beyond the divergent ends of the strip while the tongue provides a convexly curved face disposed generally slopingly relative to the said surface of the container side, whereby, on rotation of the shaft and disc, a single seed is removed by each receptacle when passing through the seed supply and which seed is slid along the said surface of the container side for discharge through the opening in the said container side on passing of the receptacle across said opening whereas the shape of the receptacle and the resiliency of the arms permit retention by the receptacle of seeds of varying sizes and thicknesses.

7. Means as claimed in claim 1 wherein the said internal surface of the container is substantially flat.

* * * * *